W & T. Schnebly.
Revolving Rake.
Nº 29105  Patented Jul. 10, 1860.
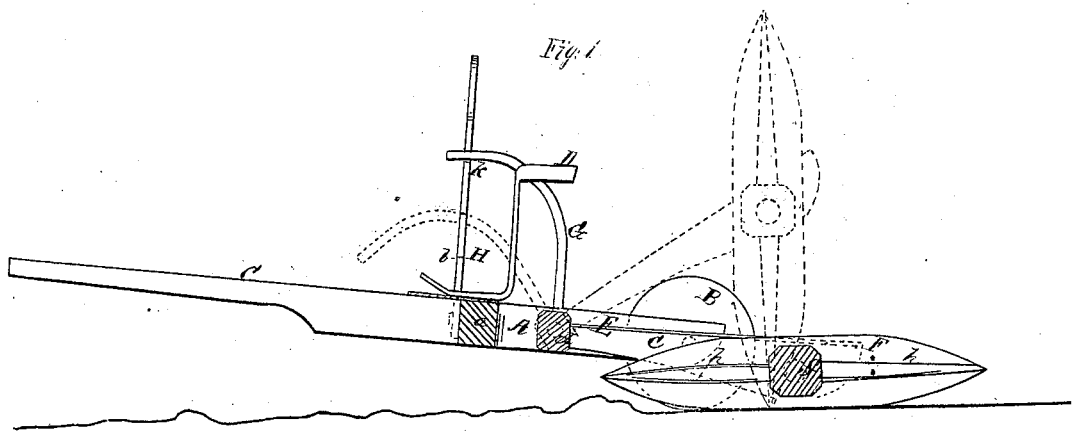
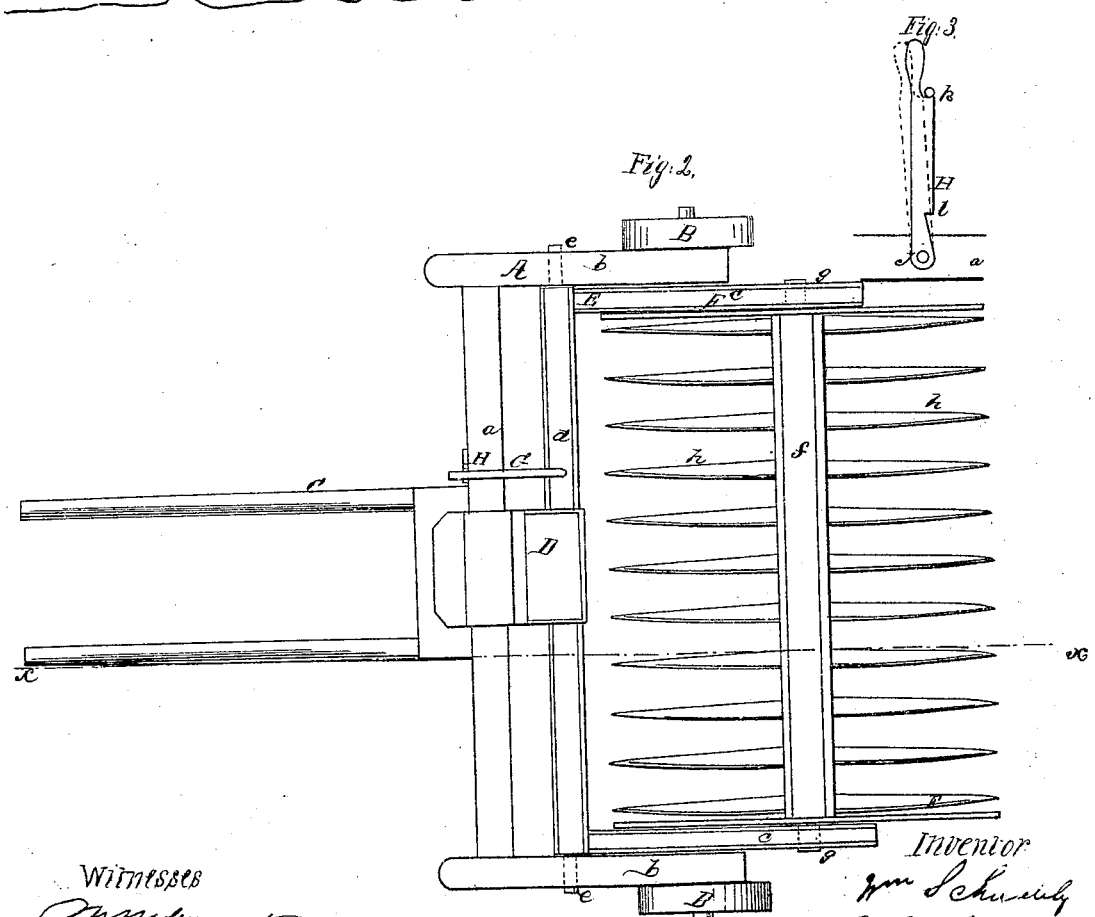
Witnesses
Inventor
Wm Schnebly
Thos Schnebly

UNITED STATES PATENT OFFICE.

WM. SCHNEBLY AND THOS. SCHNEBLY, OF HACKENSACK, NEW JERSEY.

IMPROVEMENT IN HORSE-RAKES.

Specification forming part of Letters Patent No. 29,105, dated July 10, 1860.

*To all whom it may concern:*

Be it known that we, WILLIAM SCHNEBLY and THOMAS SCHNEBLY, both of Hackensack, in the county of Bergen and State of New Jersey, have invented a new and Improved Horse-Rake; and we do hereby certify that the following is a full, clear, and exact description of the same, reference being had to the annexed drawings, making a part of this specification, in which—

Figure 1 is a side sectional view of our invention, taken in the line $x\ x$, Fig. 2; Fig. 2, a plan or top view of the same; Fig. 3, a detached view of the lever which retains rake in either of its two positions.

Similar letters of reference indicate corresponding parts in the several figures.

To enable those skilled in the art to fully understand and construct our invention, we will proceed to describe it.

A represents a carriage or mounted frame. B B are its wheels, and C the thills. D is the driver's seat, which is attached to the front traverse-bar $a$ of the carriage. The frame or carriage A may be simply two side bars $b\ b$, connected near their front ends by the traverse-bar $a'$, and having a small truck-wheel, B, at the back part of each bar $b$, as shown clearly in Fig. 2.

E is a swinging frame, which is fitted in or attached to the carriage A. The frame E is formed of two parallel side bars $c\ c$, connected at their front ends by a shaft, $d$, the tenons or journals $e$ of which are fitted in the side bars $b\ b$ of the carriage and allowed to turn freely therein. Between the bars $c\ c$, near their back ends, the rake-head $f$ is placed, its journals $g$ being allowed to turn freely in the bars $c\ c$. The rake-head is provided with two sets of teeth, $h\ h$, which project from opposite sides of it, are rigid, and may be constructed of either metal or wood. The under side of the bars $c\ c$ have their back ends rounded similar to sled-runners, as shown by the dotted lines in Fig. 1.

On each end of the rake-head $f$ a shoe, F, is placed. These shoes are of oblong elliptical form, as shown clearly in Fig. 1, and they may be of greater or less height, as may be desired. These shoes run on the ground and support the rake and back part of the swinging frame E when the same are in a working position. The length of the shoes may be about equal to the length of two of the teeth, the ends of the rake-head passing through the centers of the shoes.

To the shaft $d$ of the swinging frame E a curved bar, G, is attached. The upper end of this bar extends over the traverse-bar $a$ of the carriage A, and by the side of a lever, H, the lower end of which is attached by a bolt, $j$, to the traverse-bar $a$.

The operation is as follows: When the implement is at work the shoes F rest on the ground, the rake-teeth being in a horizontal position, with their ends near the ground. The bar G has its upper end extending over a shoulder, $k$, on lever H, and the latter thereby prevents the casual rising of the back part of the swinging frame. As the implement is drawn along the rake gathers the hay or grain, and when full the driver moves aside the lever H and throws the shoulder $k$ from underneath the bar G, and the front of the teeth will, owing to the draft movement of the machine, catch into the earth, and the rake will make half a revolution and discharge its load, the back part of the frame E rising as the rake rotates or turns. The tendency of the front teeth of the rake to catch into the earth is very slight, and the rake in consequence is not subjected to any strain thereby, nor is the rake liable to be casually rotated by the releasing of the frame E. This result is due to the relative position of the rake-head $f$, shaft $d$ of the swinging frame E, and the line of draft of the thills. These parts, it will be seen, are nearly in line with each other, or in the same plane, and consequently there is not any appreciable degree of a downward-drag movement given the front teeth of the rake. Were the carriage A elevated, and the shaft $d$ in a plane considerably above the rake, the latter would by the draft movement be subjected to considerable strain, and would be liable to tear up clods of earth and penetrate the ground, and operate, as a whole, very inefficiently. In order to have the rake, shaft of the swinging frame, and thills in the relative position specified, low truck-wheels or those of small diameter are required.

When the implement is to be drawn from one place to another, and the raking operation not required, the driver throws down the bar G, and thereby elevates the swinging frame E and rake above the ground, as shown in red, Fig. 1, the bar G being retained in a depressed position by a shoulder, $l$, on the lever.

By using shoes F, of greater or less height or depth, the rake may be made to run the desired distance from the surface of the ground as the nature of the work may require. In raking grain they would require to be sufficiently deep to keep the rake-teeth considerably above the earth. In some cases the shoes may be dispensed with entirely—in smooth grass lands, for instance. In this case the side bars $c\,c$ of the swinging frame may run directly on the ground.

The frames of raking-machines are ordinarily constructed of quadrilateral form—that is to say, they are composed of two side bars and a front and rear cross-bar. In our improvement it will be noticed that we dispense with the rear cross-bar, our wheels being arranged upon pins or axes that project, respectively, from the extremities of the side bars $b\,b$. By this arrangement the rear part of the frame is left entirely open for the free admission and operation of the rake, and the use of an axle-tree extending from wheel to wheel is also avoided. The machine is thus rendered lighter in weight, more compact, the wheels may be made smaller, and the line of draft brought down more nearly to the plane of the rake-teeth when they are set to rake the hay. The necessary lateral strength or stiffness is imparted to the frame A by having the front bar $d$ or axis-bar of the swinging frame arranged between the axes of the wheels and the front bar $a$ of the frame. By this arrangement, therefore, the bar $d$ is caused to serve the double purpose of an axis-bar for the rake and also as a strengthening-bar to the frame A, for it constantly resists the inward pressure of the wheels upon the extremities of the bars $b$, and preserves the frame A in proper form, answering the purposes of a rear cross-bar upon the frame. We are thus enabled to dispense with an axle-tree extending from wheel to wheel, and also with the rear cross-bar of the frame as commonly made.

Having thus described our invention, what we claim as new, and desire to secure by Letters Patent, is—

1. The arrangement of the axis-bar $d$ of the swinging frame E between the axes of the wheels B B and the traverse-bar $a$, as herein shown and described, so that the rear ends of the bars $b\,b$ will be supported against the inward pressure of the wheels, all as set forth.

2. The arrangement of the wheels B B and their axes upon the extremities of the side bars $b\,b$, which carry the swinging frame, whereby the employment of an axle-tree extending from wheel to wheel is avoided, and the inside of the frame is left entirely open for the unobstructed operation of the rake, all as herein represented and described.

WM. SCHNEBLY.
THOS. SCHNEBLY.

Witnesses:
WM. THOMPSON,
M. M. LIVINGSTON.